US005643615A

United States Patent [19]

Austin

[11] Patent Number: 5,643,615

[45] Date of Patent: Jul. 1, 1997

[54] APPARATUS AND METHODS FOR FORMING WORKPIECES

[75] Inventor: Michael D. Austin, Flushing, Mich.

[73] Assignee: Atlas Technologies, Inc., Fenton, Mich.

[21] Appl. No.: 401,763

[22] Filed: Mar. 10, 1995

[51] Int. Cl.[6] .......................... B29C 31/00; B29C 37/00

[52] U.S. Cl. .......................... 425/186; 100/207; 425/193; 425/397; 425/403.1; 425/411; 425/436 R

[58] Field of Search .......................... 100/207, 208, 100/209; 264/294, 296; 425/186, 193, 195, 397, 403.1, 411, 436 R, 436 RM

[56] References Cited

U.S. PATENT DOCUMENTS 3,516,277 6/1970 Bracco et al. .......................... 100/207
4,421,469 12/1983 Egger et al. .......................... 425/186
4,923,381 5/1990 Delmer et al. .......................... 425/186
5,186,958 2/1993 Schmidt .......................... 425/193

*Primary Examiner*—C. Scott Bushey
*Attorney, Agent, or Firm*—Learman & McCulloch

[57] ABSTRACT

Die presses containing removable dies and arranged in a row for operating successively on a workpiece which traverses such row utilize movable die carts which not only are capable of substituting one set of dies for the dies in the presses, but which also effect transfer of workpieces between successive presses.

16 Claims, 5 Drawing Sheets

1
2
C1
C2
C3
C4
C5
C6
C7
C8
C9
C10
P1
P2
P3
P4
P5
P6
P7
P8
7
8
9
10
11
12
14
17
18
19
20
21

APPARATUS AND METHODS FOR FORMING WORKPIECES

This invention relates to apparatus and methods for exchanging workpiece forming dies in forming presses and for transferring workpieces successively to each of a plurality of such presses.

BACKGROUND OF THE INVENTION

The production of finished workpieces from blanks traditionally is accomplished by the use of a series of forming presses or stations arranged longitudinally in a row wherein a workpiece is fed to a forming die at one end of the row that changes the shape of the workpiece. Although a finished part can be made in one forming operation, it is more common to use three to ten successive forming operations to produce a finished part from a blank. Each forming operation normally uses a forming die that is made to reshape or reform the workpiece that is delivered to such die. Each die normally comprises a die set having vertically adjustable upper and lower halves that move relative to one another following delivery of a workpiece between the die halves so that relative movement of the halves toward one another engages and reforms the workpiece.

Apparatus for performing successive forming operations on a workpiece may comprise a single forming press having a plurality of forming dies within the press to each of which a workpiece is moved in succession. This type of forming press is known as a transfer press and, once the workpiece has been introduced to one end of the press, it is transferred from die to die by transfer means contained wholly within the press. A transfer press conventionally produces a finished part.

Another type of apparatus for forming workpieces comprises a progressive die press wherein all the dies are contained within a single press. In this case, however, a strip of material is fed into one end of the press and the part is made by stamping the strip at successive die forming stations leaving the part attached to the strip until the last die operation at which the part is cut free from the strip. The movement of the workpiece from die to die is carried out by movement of the strip to which the workpieces are attached, thereby requiring no workpiece transfer apparatus other than the strip feeder itself. However, because of the need to keep the workpieces attached to the strip until the final die operation, there can be excessive scrap. Further, the dies need to be maintained quite close together thereby complicating the construction and exchange of the dies.

There also exists what is known as a tandem press line which comprises a plurality of individual forming presses arranged in a row with each of the presses being uniformly spaced from one another. In a tandem press line a workpiece is delivered to the press at one end of the row and shaped by operation of that press. The workpiece then is transferred from the first press across the space between the first press and the next adjacent press, following which the workpiece is transferred to the adjacent press and again shaped. This procedure is repeated for each of the presses in the row.

In all of the systems referred to, it is necessary to provide for delivery of the workpiece into the first press or die station, transfer of the workpiece from the first press or die station to the next, and transfer of the finished workpiece from the final press or die station to some kind of workpiece receiver.

The handling of the workpiece during its transfer to and from the presses has resulted in severe problems. It is preferable to transfer the workpiece by some kind of automatic material handling apparatus because such apparatus is faster, frequently less expensive, and less dangerous to personnel and to the workpieces themselves as compared to manual transfer.

Automatic material handling systems for presses can take various forms. Typically, special purpose overhead lift, carry, and place mechanisms are used to load and unload the presses by means of vacuum cups or grippers. Such mechanisms also may be used to transfer workpieces between the presses.

When a change in the workpieces to be formed is made it is necessary to change the die sets in the presses. This usually necessitates the provision of equipment to relocate the workpiece transfer apparatus to enable the die sets in the presses to be replaced by other die sets. The conventional transfer apparatus is supported on a floor mounted framework at one end of the row of presses, as well as between adjacent presses, although in some installations it is possible to raise, lower, or bodily move the transfer apparatus to positions in which the die sets may be moved into and out of the presses.

There are many kinds of automatically operable material handling or workpiece transfer devices for use in press line applications. For example, there are lift and carry shuttles, conveyors, robotic arm devices, and articulated arm units which function to transfer a workpiece from one position to another in timed relation to the operation of the presses.

Regardless of the type of workpiece transfer devices that have been used, all must be removed from the press line to allow die exchanges to be performed or to permit access to the die for maintenance or other operations.

Forming presses make use of die sets composed of upper and lower halves for the manufacture of each part or, more precisely, for each operation needed to make the finished part. The presses in the press lines are capable of operating on more than one specific part thereby necessitating exchanging of a die set designed for forming one part with another die set for forming a different part, and vice versa. To enable the exchange to be made efficiently, the workpiece transfer apparatus must be relocated or adjusted to avoid interference between the transfer apparatus and the die sets and the apparatus by means of which the exchange is effected.

In modern press installations a single press can run hundreds of parts without any change of the dies, but it is more common to run between five to twenty parts per press for most production processes. Since the dies can be quite large and heavy, e.g., 1 to 75 tons, exchanging one set of dies for another heretofore has been a difficult process that can require as much as an entire production shift to perform. If a production run is limited to a small number of parts, a large number of die changes are necessary. If six to eight hours are required for each exchange, production time is limited severely.

Die changing equipment has been developed and is in use which enables the exchanging of dies to be performed relatively quickly. Part of this equipment comprises a movable die cart having wheels which ride on floor tracks between positions in which a die set can be moved from the cart into a press from one side thereof while the die set previously in the press simultaneously is moved out of the press onto another cart that is positioned on the opposite side of the press.

Die carts enable the elimination of a great deal of time required to effect press changeover. In a tandem press line, for example, the carts move into position at each end of the press line as well as between adjacent presses and effect exchange of the dies. Many different die exchange arrangements can be used effectively, with anywhere from one to four or more presses being serviced by each die cart. The die carts, when not in use in exchanging dies, normally are parked in an area remote from the presses so as to provide room for personnel and the workpiece transfer apparatus during operation of the press. For example, a so-called "domino" process can change the dies in a tandem press line, or a transfer/progressive/blanking press in three simple steps. This process uses one more die cart than the number of presses and the three steps are: (1) preload all of the die carts except one with a "new" die set and move the carts into the press line, the empty die cart being located at one end of the press line; (2) drive the "old" die sets from the associated presses in a direction toward the empty die cart simultaneously, thereby enabling the "old" die sets to move from the presses onto the die carts as the "new" die set is being inserted into the adjacent press; and (3) move the die carts now carrying the "old" die sets out of the line of presses. In this operation the die cart initially having no die set will bear one of the "old" die sets, whereas the die cart at the opposite end of the line will not carry a die set.

Die carts which function in the described manner have been manufactured heretofore by Atlas Technologies, Inc., of Fenton, Mich., and are in use worldwide.

Following removal of the die carts and the "old" die sets from the line of presses, material handling apparatus for transferring the workpieces into and out of the presses is positioned in the spaces between adjacent presses, and the die carts are parked in an area remote from the presses.

Although the use of a movable die cart to facilitate die exchanges has many benefits, available floor space in many existing facilities imposes severe limitations on the use of movable die carts. In many large press facilities, the physical plant was designed and constructed many years ago, and such designs were dictated by economics and then available materials. In many instances a series of parallel tandem press lines was used including two press lines per bay and having an overhead crane for moving die sets. In some cases the crane tracks spanned the width of the bay so as to be perpendicular to the press rows, whereas in other instances the crane tracks and press rows paralleled one another. Conventionally, the two parallel press lines have adequate spacing between them to form an aisle for movement of the die sets to and from the presses as well as accommodating the need for access space for press maintenance. Conventionally a smaller aisle on each of the outer edges of the building's bay is provided, but such aisles usually are quite narrow because of the foundation requirements for the presses, crane track supporting. columns, and the like.

In most cases the older press facilities provide no allowance for either die carts or movable material handling apparatus because they relied upon manual handling of the parts between the presses and therefore had no need to provide floor space for automatic material handling apparatus at the ends of the rows and between adjacent presses. Neither was any allowance made for parking any type of movable die or other cart remote from the presses when the presses were in operation. Consequently, the benefits available from the use of movable die carts for rapid die exchange were difficult to achieve in some of the older facilities.

One partial solution to the problem involved the use of what is known as "sister" press lines wherein two nearly identical, parallel rows of presses could be serviced by one line of carts located in the central aisle between them. This solution necessitated that the two rows of presses be nearly identical and also restricted the scheduling flexibility since the die sets in the two rows could not be exchanged at the same time. Further, die prestaging for each line could require several hours' delay from one row to another while waiting on cranes to unload "old" dies from one row of presses to make room for prestaging the "new" dies for the other row. In addition, the die carts had to park in the center aisles because the outer aisle, i.e., those next to the walls of the building, were not accessible by the cranes because the crane tracks were not long enough.

As a result of the inability of the older facilities to accommodate the die cart die exchange system, it has been necessary to park the die cart in positions between parallel rows of presses and to move and park any workpiece transfer apparatus associated with the presses in the aisles alongside the building walls, thereby losing the use of the aisles for traffic and maintenance access. In addition, the space between adjacent rows of presses conventionally is incapable of accommodating more than one die cart, thereby necessitating utilization of the "sister" concept or limiting the ability of the die carts to serve as only one of the two lines.

A principal object of the invention is to overcome the problems referred to above.

SUMMARY OF THE INVENTION

Apparatus and methods according to the invention enable the disadvantages referred to above to be overcome by the provision of die carts which may be moved into positions at the opposite ends of a row of presses and between adjacent presses to enable die exchanges to be effected and, at the same time, provide support for the material handling or workpiece transfer apparatus by means of which workpieces may be transferred into a press at one end of the row and from press to press to the opposite end of the row, as well as from the last press at such opposite end of the row. By enabling each die cart to accommodate not only the die sets, but also the workpiece transfer apparatus, each cart may remain in the row of presses during operation of the presses, thereby avoiding the necessity of parking the die carts or the workpiece transfer apparatus in the aisles. This arrangement makes it possible to locate die racks between the rows of presses in positions to and from which the die carts may be moved to load and unload die sets during die exchange operations. Die sets may be transferred to and from the die racks by overhead cranes or any other suitable means.

In essence, a movable cart according to the invention is capable of supporting not only the die sets and effecting die exchanges, but also the workpiece transfer apparatus, thereby enabling the carts to be parked in the press line during operation of the presses, rather than in the aisle or between the rows of presses.

A particularly significant characteristic of apparatus and methods according to the invention is the more efficient utilization of the available floor space in press room facilities and the elimination of the previously burdensome restrictions.

BRIEF DESCRIPTION OF THE DRAWINGS

Apparatus constructed in accordance with the presently preferred embodiment of the invention is illustrated in the accompanying drawings, wherein.

THE PREFERRED EMBODIMENT

Figure 1:
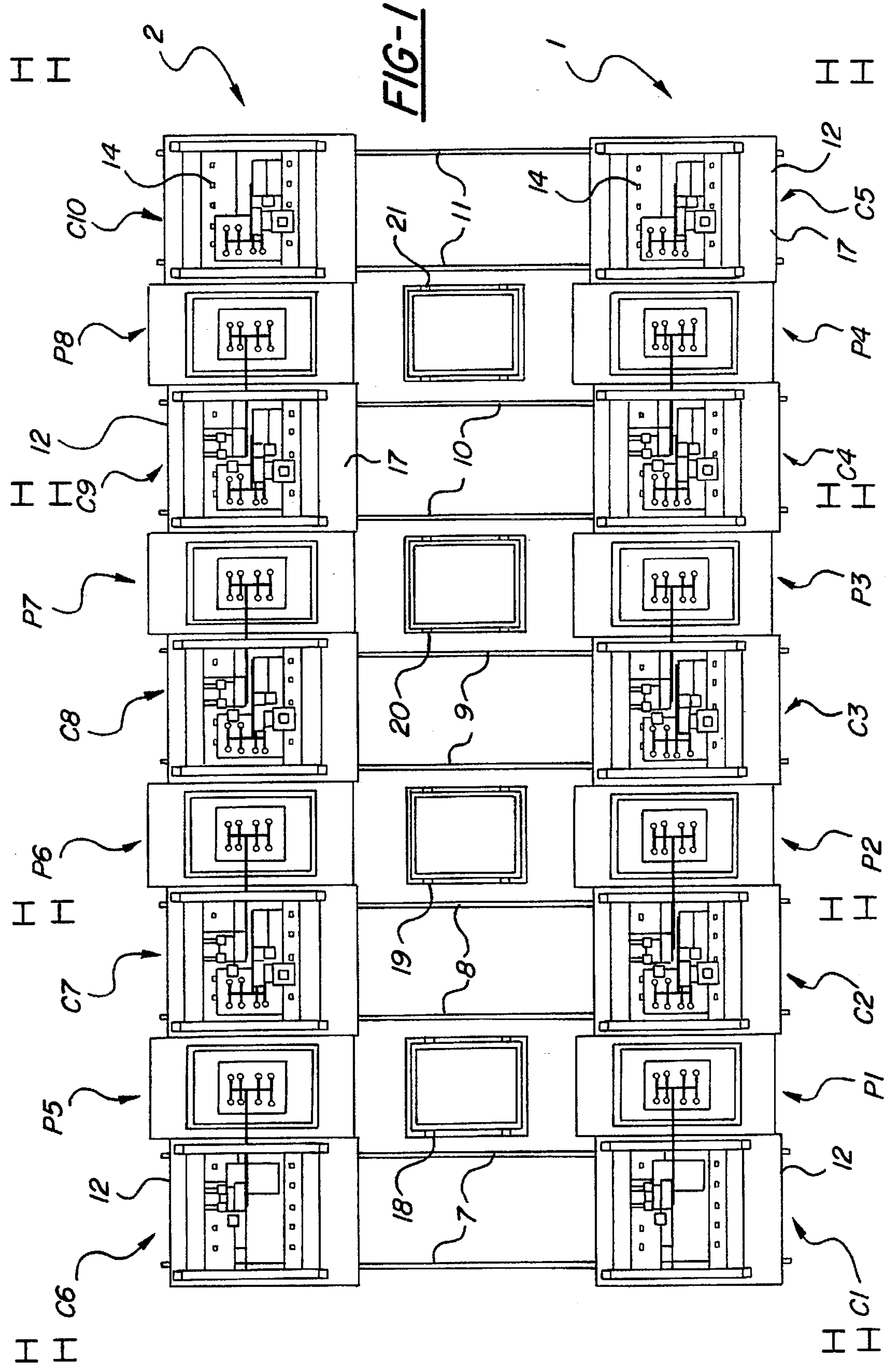
FIG. 1 is a diagrammatic top plan view of two rows of die presses with stationary die racks positioned between the rows.

Apparatus constructed in accordance with the presently preferred embodiment of the invention is adapted for use in conjunction with conventional die presses arranged in parallel, longitudinally extending rows 1 and 2. The presses of row 1 are indicated at P1, P2, P3, and P4 and the presses of row 2 are indicated by the reference characters P5, P6, P7, and P8. Each press comprises a bed 3 on which the lower half 4 of a die set 5 removably may be fixed, the upper die half 6 being removably fixed to a vertically reciprocable ram (not shown) as is conventional. Each illustrated press P1–P8 is identical for convenience of illustration, but it should be understood that the presses in rows 1 and 2 need not necessarily be the same, or of the same size, or adapted to accommodate the same workpieces.

Extending between the two rows 1 and 2 of presses are five sets of parallel tracks, 7,7; 8,8; 9,9; 10,10; and 11,11. Movably supported on each pair of tracks are two wheeled die carts. Five die carts C1–C5 are associated with row 1, and five die carts C6–C10 are associated with the row 2. In the illustrated embodiment, each die cart is the same, although it should be understood that, if the presses of rows 1 and 2 operate on different workpieces, the associated die carts also may be modified to accommodate the respective workpieces.

Each die cart comprises a body 12 mounted on wheels (not shown) which ride upon the respective pairs of tracks 7–11. Each die cart also has an upper surface through which a plurality of sets of rollers 14 protrude. Each cart also includes in its upper surface a channel 15 which parallels the rows 1 and 2 and within which is a mounted a reciprocable driver 16 (see FIG. 7). Each cart is provided with a housing 17 within which is mounted the operating mechanisms and controls for driving the wheels and the drivers.

As thus far described, the die carts C1–C10 are conventional and correspond to those that are and have been manufactured by Atlas Technologies, Inc.

In the aisle between the rows 1 and 2 of presses and in alignment with the opposed pairs of presses P1-P5, P2-P6, P3-P7, and P4-P8 are mounted preferably stationary die racks 18, 19, 20, and 21, there being one die rack for each opposing pair of presses. Each die rack is conventional and has an upper surface on which a die set 5 may be supported for prestaging. Each die set may be delivered to its associated die rack by an overhead crane or other suitable means (not shown) as is conventional.

Each of the die carts constructed in accordance with the invention is modified from the conventional construction by the inclusion of a superstructure 24 comprising vertical and horizontal frame members 25 and 26, respectively. The superstructure 24 provides support for workpiece transfer apparatus designated generally by the reference character 27 and which may comprise any one of a number of conventional devices. As shown in FIGS. 1–7, the transfer apparatus 27 corresponds to a mechanism manufactured and sold by I. S. I. Robotics Corporation, Fraser, Mich., under the trademark PATHFINDER. Each transfer apparatus 27 comprises at least one carriage 28 which is reciprocable horizontally in a direction parallel to the associated row 1 and 2 of presses and a second carriage 29 carried by the first carriage 28 and mounted in a slide 30 for vertical reciprocation. To the vertically reciprocable carriage 29 is pivoted one end of a linkage 31 at the opposite end of which is supported an arm 32 at the free end of which is mounted a workpiece support 33 having vacuum cups 34 or other suitable workpiece engaging and supporting means.

Figure 2:
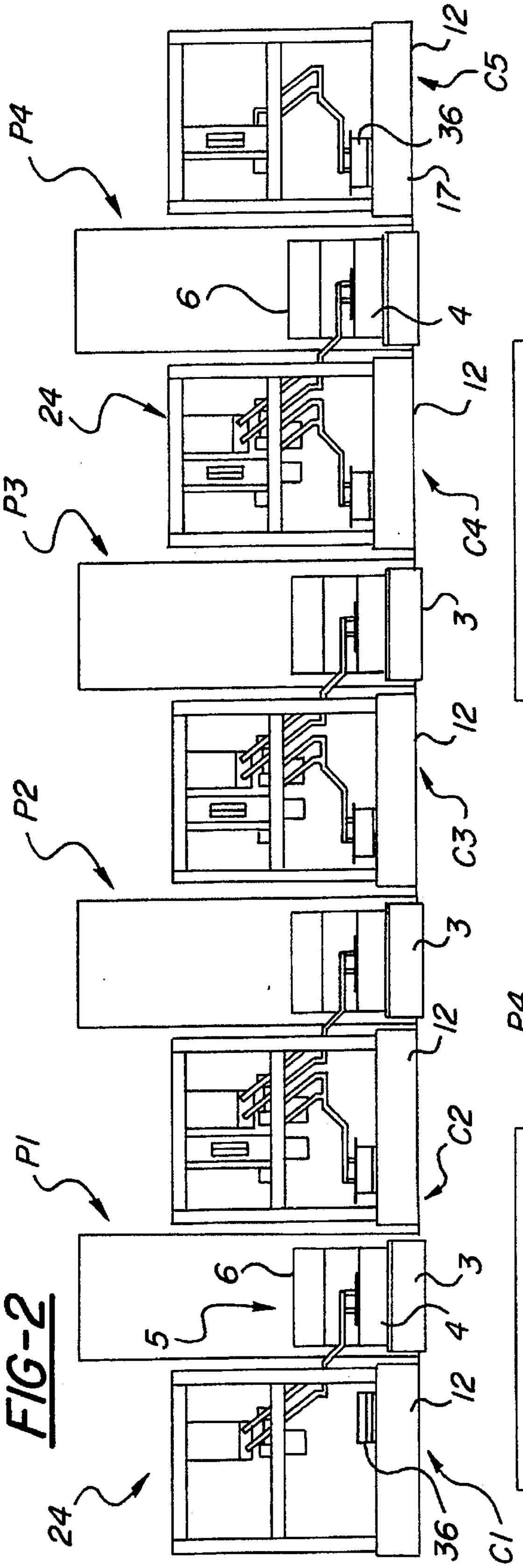
FIG. 2 is a diagrammatic side elevational view of the row of presses shown at the bottom of FIG. 1.
Figure 3:
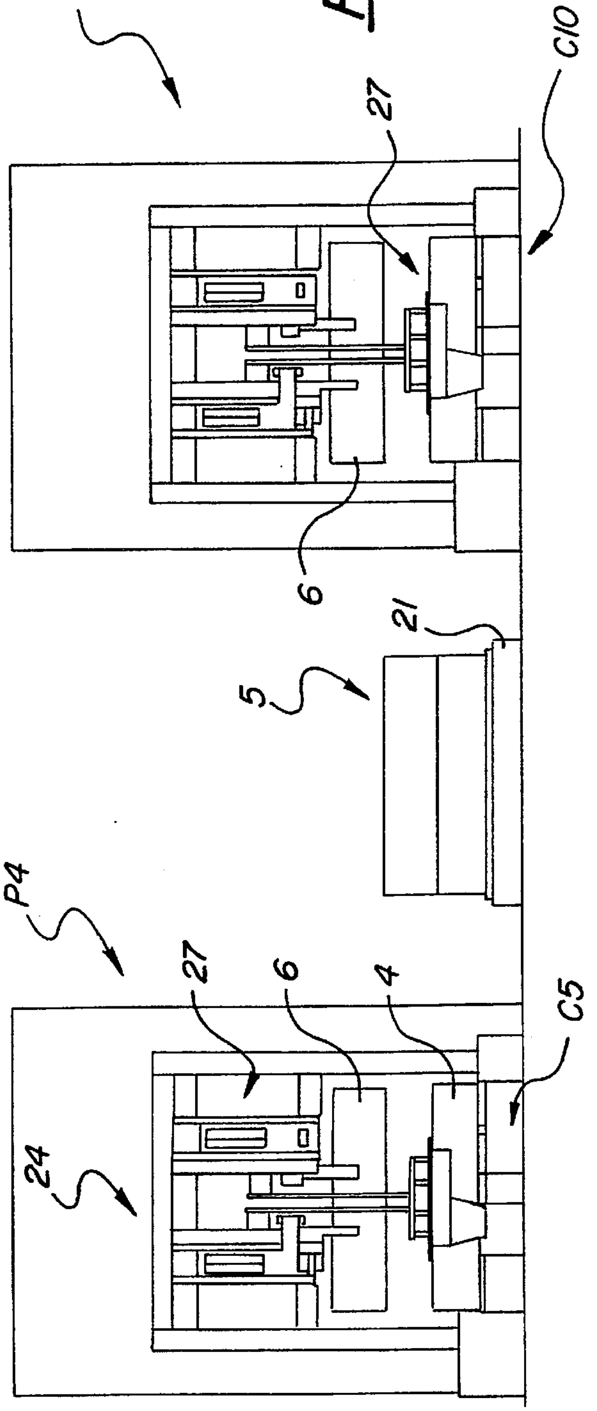
FIG. 3 is a diagrammatic end elevational view of the apparatus shown in FIG. 1.
Figure 7:
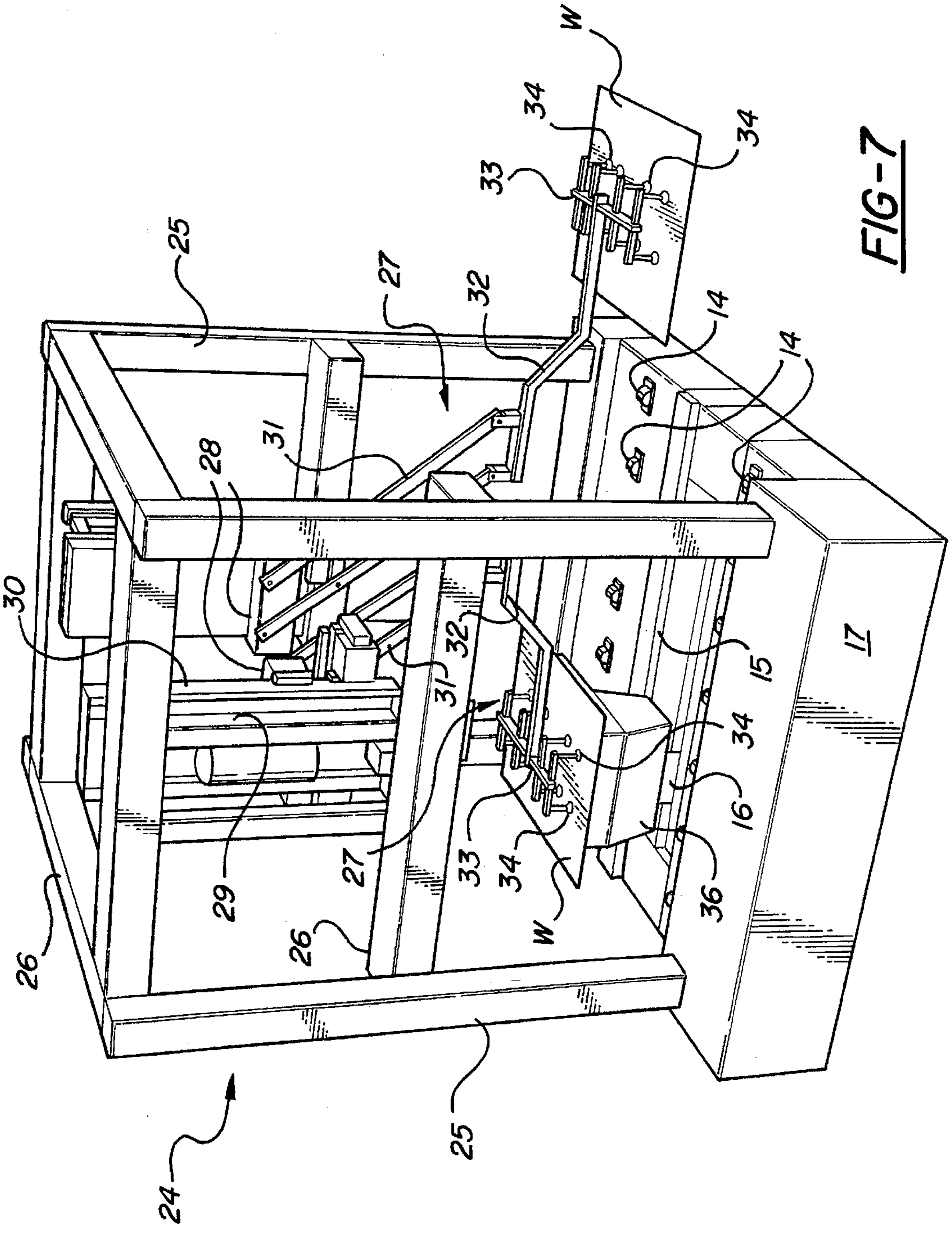
FIG. 7 is an enlarged, diagrammatic, isometric view of one of the die carts and its associated equipment.

As is best illustrated in FIGS. 1 and 2, each row of presses 1 includes four presses and five die carts. There is one die cart at each end of each row and one die cart between each adjacent pair of presses. The die carts at the ends of the rows of presses are required to move workpieces only from the die cart at one end of the press row into the adjacent press or to move workpieces from the press at the opposite end of the row to the die cart at that end. However, the die carts between adjacent presses must be capable of moving workpieces from one press to the die cart between two presses and from such die cart to the next adjacent press. Accordingly, the die carts at opposite ends of the rows of presses need have only one transfer apparatus 27, whereas the die carts which occupy positions between adjacent presses have two. FIG. 7 shows two of the transfer apparatuses.

The die carts C1–C10 also are modified from the conventional die cart to include a removable riser or workpiece supporting nest 36 for supporting a workpiece W on the die cart. As is shown in FIG. 2, each riser 36 has its upper surface at a level corresponding to that of the upper surface of the lower die half 4 in the adjacent press. As also is shown in FIG. 2, the riser 36 at the left hand cart C1 is at the right hand side of the cart, whereas the risers 36 of all other die carts shown in FIG. 2 are at the left hand end of such carts. Movement of the riser between left hand and right hand sides of each cart and in the associated groove 15 is effected by the reciprocable driver 16 within the groove 15 and coupled to a reciprocable drive (not shown) within the housing 17.

In the operation of the apparatus thus far described, each press will have an open die set 5 therein and each die cart will have a riser 36 thereon. Workpieces to be formed in the presses will be placed in a stack at the left hand end of each row 1 and 2, as is conventional, and individual sheets will be lifted from the stack and placed on the riser 36 at the left hand end of each row of presses by conventional destacking equipment such as that manufactured by Atlas Technologies, Inc. The workpiece W in FIG. 2 will be transferred from the riser 36 of the die cart C1 at the left hand end of the row 1 to a position between the lower and upper die halves 4 and 6 of the die set 5 of the first press P1. The transfer apparatus 27 will release the workpiece W so that it is supported by the lower die half 4 and the transfer apparatus will be withdrawn from between the die halves.

Following placing of the workpiece on the lower die half and withdrawal of the transfer apparatus from between the halves of the die set 5, the upper die half 6 will be moved downwardly so as to form the workpiece between the halves of the die set. Thereafter, the upper die half will be moved upwardly and the transfer apparatus of the next adjacent die cart C2 operated to remove the formed workpiece from the press P1 and transfer it to the riser 36 of the cart C2, following which the riser is moved to the right from the position shown in FIG. 2. The workpiece transfer apparatus associated with the cart C2 then transfers the workpiece from the cart C2 to the press P2 and deposits it between the open upper and lower die halves. This process is repeated to transfer the workpiece successively from the press P2 to the cart C3, to the press P3, to the cart C4, and to the press P4. The transfer apparatus associated with the cart C5 transfers the fully formed workpiece from the press P4 to the riser of the cart C5, such riser is moved to the right from the position shown in FIG. 2, and the fully formed workpiece then is removed from the cart C5 by conventional means (not shown).

Following the end of a production run of workpieces that are to be formed in the row 1 of presses, the risers 36 are removed from the carts and the transfer mechanisms 27 are adjusted to positions in which they are withdrawn from the presses and elevated to a position above the level of the closed die sets 5. The carts of the row 1, still carrying the elevated transfer mechanisms, then are moved to positions alongside the die racks 18–21, as is shown in FIG. 4.

The die racks contain "new" die sets *5a* which are driven to the left onto the carts C1–C4, respectively. The cart C5 at this time does not contain either of the die sets 5 or *5a*. The carts C1–C5 then are returned to the row 1 and to the positions shown in FIG. 1.

The die set 5 then may be transferred from the press P4 to the empty cart C5, thereby enabling the die set *5a* to be moved from the cart C4 to the press P4. This movement of the die set 5 from the press P3 enables the die set *5a* on the cart C3 to be moved into the press P3. In the same manner the die sets 5 are transferred from their presses P1 and P2 to the die carts C2 and C3, thereby enabling the die sets *5a* to be moved from the cart C1 and C2 to the presses P1 and P2, respectively. The cart C1 at this stage will not contain any die set at all.

Figure 4:
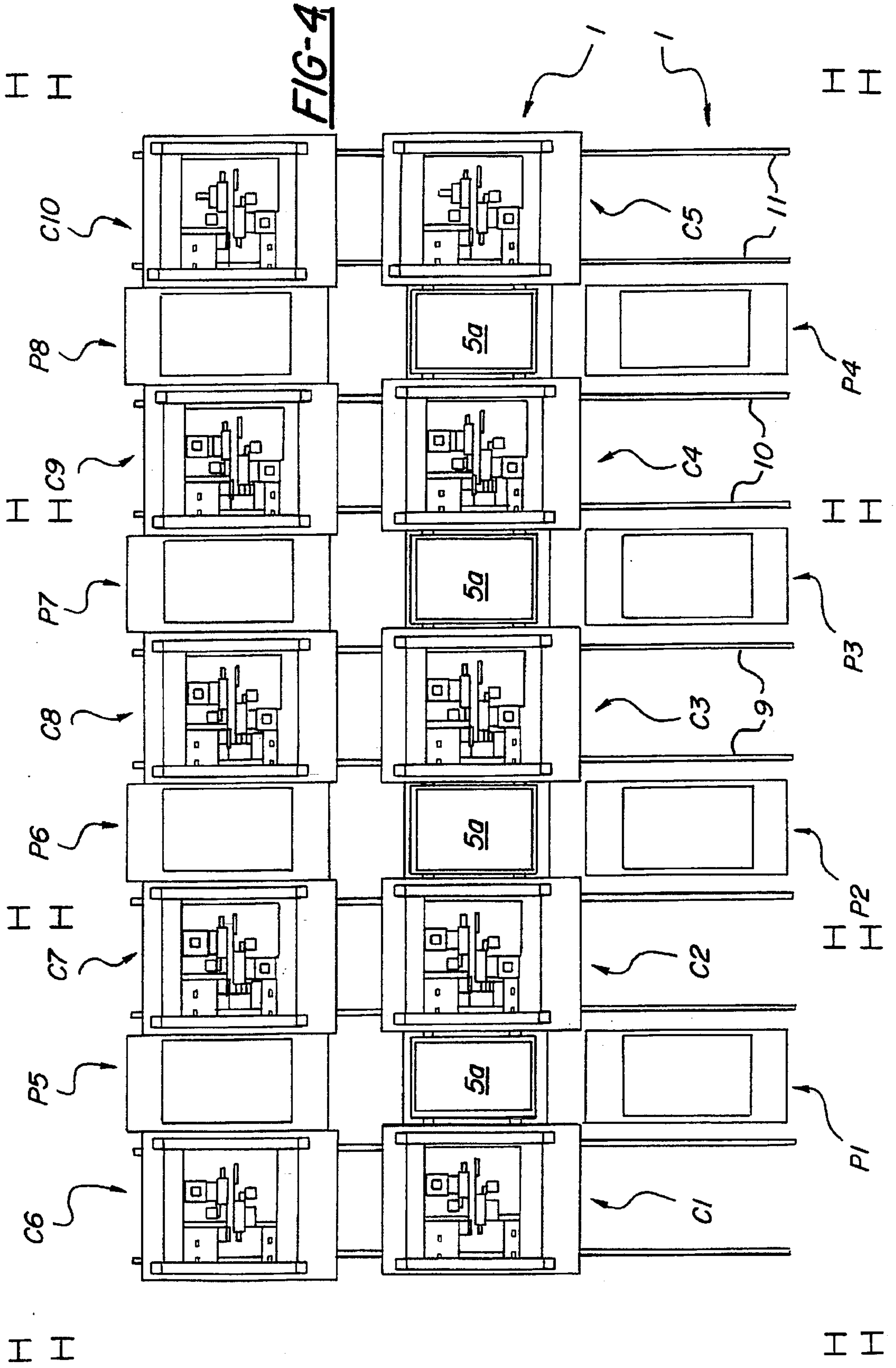
FIG. 4 is a view similar to FIG. 1, but illustrating the die carts shown in the bottom row of FIG. 1 moved to a position adjacent the stationary die racks.
Figure 5:
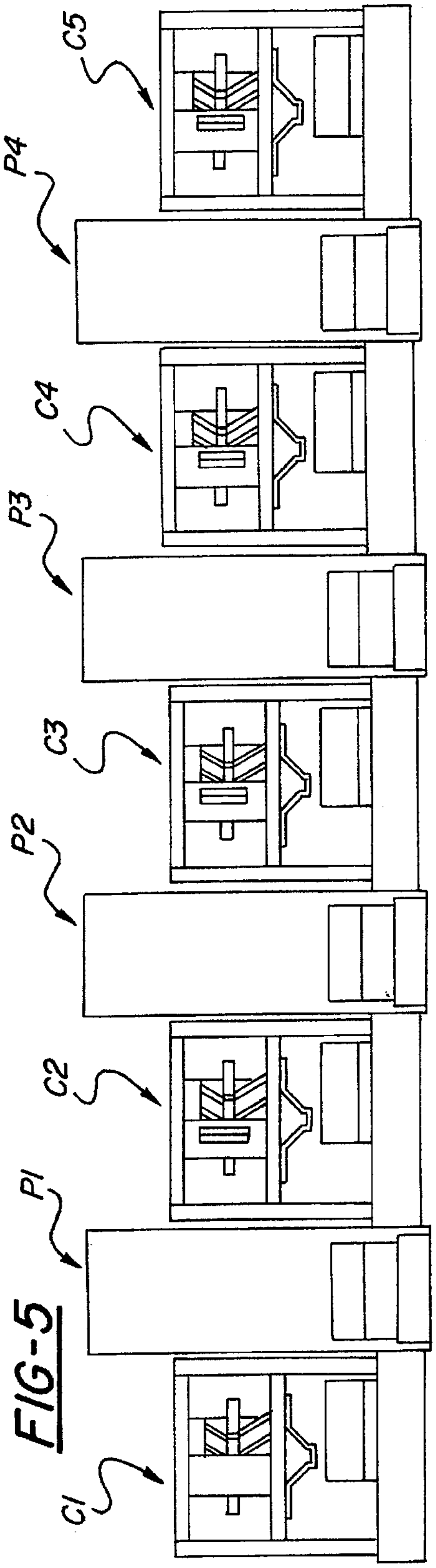
FIG. 5 is a diagrammatic side elevational view of the apparatus shown in FIG. 4.
Figure 6:
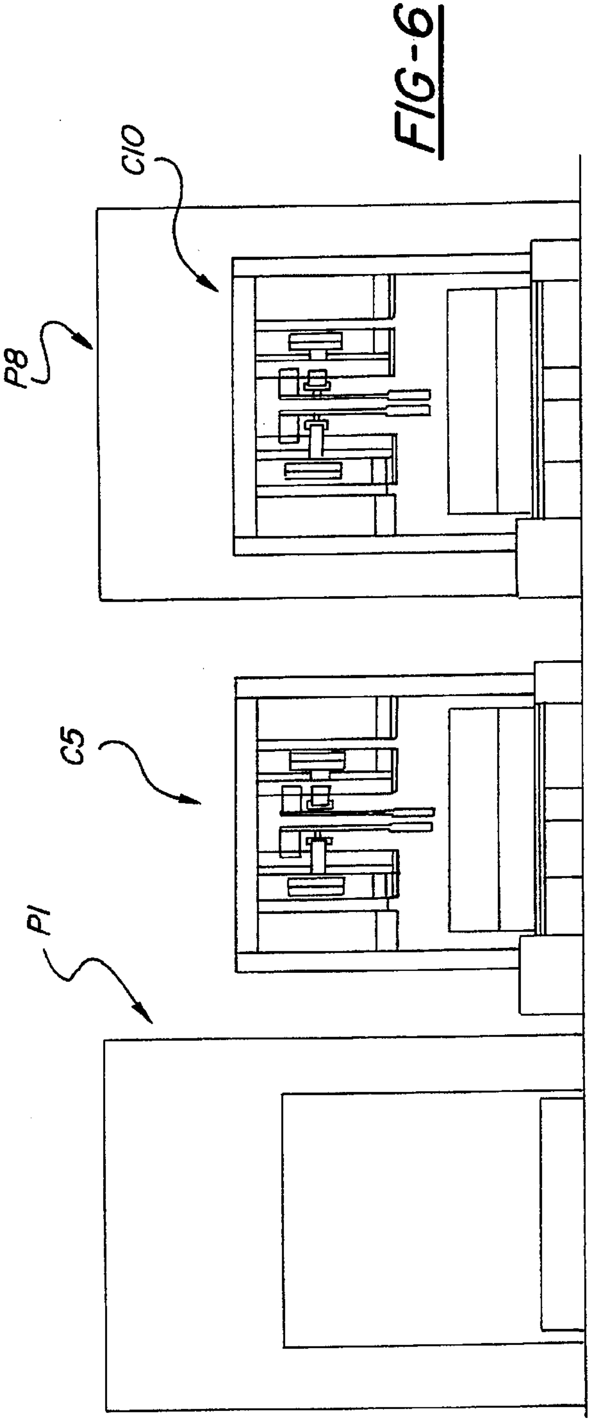
FIG. 6 is a diagrammatic end elevational view of the apparatus shown in FIG. 4.

Once the die sets 5 have been transferred from their respective presses to the carts C2–C5, such carts may be returned to the positions shown in FIG. 4 alongside the die racks, thereby enabling the die sets 5 to be transferred from the die carts to the associated die racks. The die sets 5 then may remain on the die racks or be removed from the die racks so as to enable other dies to be moved thereto.

Following movement of the die sets 5 off the respective die carts C2–C5, the transfer mechanisms 27 of each die cart may be reconditioned for operation and the risers 36 restored to the respective carts so as thereby to condition the presses in row 1 for operation to form additional workpieces.

The die sets in the presses of row 2 may be exchanged for other die sets in exactly the same manner as that described in connection with the exchange of dies in the presses of row 1. In this case, however, the carts C6–C10 are moved from the positions shown in FIG. 1 to positions alongside the die racks 21, and return.

The provision of one die cart more than the number of presses makes possible the exchange of die sets in a rapid, efficient manner.

In FIGS. 1 and 4 are shown H-shaped vertical supports for the roof and walls of the bay in which the presses are located. These figures also show that the side aisles between the supports and the presses are much narrower than the center aisle between the rows of presses. The narrowness of the side aisles is of little or no consequence, however, since, in the use of the invention, neither the die carts nor the workpiece transfer mechanisms are required to enter the side aisles.

The disclosed embodiment is representative of presently preferred forms of the invention, but is intended to be illustrative rather than definitive thereof. The invention is defined in the claims.

I claim:

1. Apparatus for supporting and moving a forming die into and out of a forming press in which a workpiece may be formed and for transferring a formed workpiece from said press, said apparatus comprising:

a cart movable from a first position in alignment with and adjacent one side of a forming press to a second position out of alignment with said one side of said press;

means on said cart for accommodating a forming die for movement with and relative to said cart;

means for moving said die selectively to and from said cart into said press when said cart is in said first position;

workpiece support means for removably supporting a workpiece;

workpiece transfer means for transferring a workpiece selectively from and to said support means; and means mounting said transfer means on said cart for enabling said transfer means to transfer a workpiece selectively from and to said support means when said cart is in said first position and said die is in said press.

2. Apparatus according to claim 1 including a superstructure projecting upward from said cart and wherein said transfer means is carried by said superstructure.

3. Apparatus according to claim 2 including means for adjusting said transfer means vertically relative to said superstructure to provide sufficient clearance between said transfer means and said cart to enable said forming die to be moved to and from said cart without interference from said transfer means.

4. In a workpiece forming facility having at least one forming press within which is a forming station having a die set composed of separable die halves between which a workpiece may be accommodated and formed, the improvement comprising a pair of movable carts each of which is capable of supporting said die set and each of which is capable of supporting said workpiece, one of said carts being movable to a first transfer position in which a die set supported on said one of said carts may be moved from said one of said carts into said forming station and the other of said carts being movable to a second transfer position to receive said die set from said forming station; first transfer means carried by said one of said carts and operable when said one of said carts is in said first transfer position to transfer a workpiece from said one of said carts into said forming station and between the halves of said die set; and second transfer means carried by said other of said carts and operable when said other of said carts is in said second transfer position to transfer a workpiece from between the halves of said die set to said other of said carts.

5. The construction set forth in claim 4 wherein each of said first and second transfer means is adjustable relative to the associated cart to enable such cart to support said die set and the associated transfer means simultaneously.

6. The construction according to claim 5 including a rack adjacent said press for supporting said die set, at least one of said carts being movable to and from a position adjacent said rack to enable a die set to be moved to and from said rack from and to said cart.

7. In a workpiece forming facility having a pair of substantially parallel, spaced apart rows of workpiece forming presses, each of the presses in each of said rows being spaced from one another and adapted to accommodate a die set having die halves between which a workpiece may be positioned and removed, a plurality of racks corresponding to the number and spacing of said presses, each of said racks being adapted for the removable accommodation of one of said die sets, a plurality of carts each of which is adapted to support one of said die sets, means for moving each of said carts from a first position adjacent one of said racks to a second position adjacent one of said presses and in which a die set supported on such cart may be moved into such press, and return, and means for moving a die set supported by said cart from the latter into the adjacent press when said cart is in said second position, the improvement including workpiece transfer means carried by each of said carts for transferring workpieces from said carts to the adjacent press and from such press to the next adjacent press while each of said carts is in said second position.

8. The construction according to claim 7 wherein the transfer means of each of said carts is movable to a position in which the movement of a die set to or from such cart does not interfere with said transfer means.

9. The construction according to claim 7 including means carried by each of said carts for moving a die set to and from each cart.

10. The construction according to claim 7 wherein each of said die sets comprises an upper half and a lower half, each lower half having a workpiece support surface occupying a level within its associated press which is above that of the adjacent cart upper surface, and workpiece support means carried by each of said carts when the associated die set is within said press, each of said workpiece support means having a workpiece support surface at a level corresponding to that of the adjacent lower die half.

11. A cart construction for supporting and moving a forming die set into and out of a forming press in which a workpiece may be formed and for transferring a workpiece into said press, said cart comprising:

means carried by said cart for supporting a workpiece forming die set;

means for locating said cart in a position in alignment with and adjacent said press thereby enabling said die set to be moved from said cart into said press;

means carried by said cart for supporting a workpiece following movement of said die set into said press; and workpiece transfer means carried by said cart for transferring a workpiece from said cart into said press while said cart occupies said position and said die set is in said press.

12. The construction according to claim 11 including a superstructure carried by and projecting upward from said cart.

13. The construction according to claim 12 wherein said transfer means is supported by said superstructure at a level enabling movement of said die set from said cart into said press without interference from said transfer means.

14. Apparatus for supporting and moving a plurality of forming die sets into a corresponding plurality of forming presses in which workpieces may be formed and for transferring each formed workpiece in succession to each of said presses, said presses being spaced from one another and arranged in a row, said row having an upstream end and a downstream end, said apparatus comprising:

a plurality of carts corresponding at least to the number of said presses; means on each of said carts for removably supporting one of said die sets;

means for locating one of said carts in a position at the upstream end of said row and adjacent the endmost press;

means for locating others of said carts in positions between adjacent ones of said presses;

means for moving a die set supported by each of said carts in a direction downstream of said row to place such die set in the adjacent downstream press; means for supporting a workpiece on each of said carts following movement of the associated die set into the adjacent downstream press; and workpiece transfer means supported on each of said carts for transferring a workpiece from each said cart into the adjacent downstream press following movement of the associated die set into such adjacent downstream press, the position of each of said carts during movement of said die sets and transfer of said workpieces being the same.

15. Apparatus according to claim 14 wherein the workpiece transfer means carried by each of the carts between adjacent presses is operable to effect transfer of a workpiece from one adjacent press into the next adjacent press.

16. Apparatus according to claim 14 including one additional cart corresponding to the others of said carts and movable into an operative position adjacent and downstream of the endmost press at the downstream end of said row, said additional cart when in said operative position being operable to remove a workpiece from the adjacent downstream endmost press and transfer such workpiece to said additional cart.

* * * * *